US 6,749,154 B1

(12) United States Patent
Johnson

(10) Patent No.: US 6,749,154 B1
(45) Date of Patent: Jun. 15, 2004

(54) AIRCRAFT ADVERTISING SYSTEM

(76) Inventor: Don Scott Johnson, 4606B Clewis Ave., Tampa, FL (US) 33610

(*) Notice: Subject to any disclaimer, the term of this patent is extended or adjusted under 35 U.S.C. 154(b) by 0 days.

(21) Appl. No.: 10/282,808
(22) Filed: Oct. 29, 2002
(51) Int. Cl.[7] .................................................. B64B 1/00
(52) U.S. Cl. ............................ 244/30; 244/127; 40/217
(58) Field of Search ........................... 244/30, 3, 130, 244/127, 1.7, 33, 48; 40/215–217

(56) References Cited

U.S. PATENT DOCUMENTS

| 621,195 | A | * | 3/1899 | Zeppelin | 244/127 |
|---|---|---|---|---|---|
| 1,007,405 | A | * | 10/1911 | Wagner et al. | 244/127 |
| 1,478,034 | A | * | 12/1923 | Hortz | 244/33 |
| 1,806,135 | A | * | 5/1931 | Ward | 244/3 |
| 1,881,073 | A | * | 10/1932 | Freeman | 244/130 |
| 1,893,149 | A | * | 1/1933 | Picco | 40/217 |
| 2,557,383 | A | * | 6/1951 | Kerwer | 40/217 |
| 3,103,323 | A | * | 9/1963 | Hoffman et al. | 244/1 TD |
| 3,614,033 | A | * | 10/1971 | McCarty, Jr. | 244/48 |
| 3,683,530 | A | * | 8/1972 | Robinson | 40/215 |
| 5,096,141 | A | * | 3/1992 | Schley | 244/127 |

* cited by examiner

Primary Examiner—Galen L. Barefoot
(74) Attorney, Agent, or Firm—Edward P. Dutkiewicz

(57) ABSTRACT

An aircraft advertising system comprises an aircraft. The aircraft is generally very long with respect to its width and height. A support beam is provided. The support beam has a coupling end and a free end. The coupling end has a pivot pin. In this manner the collapse of the beam is allowed for take off and landing of the aircraft. Also provided is a sign of a durable fabric material. The sign is adapted to display indicia. The sign has a top edge, a bottom edge, a front edge, a rear edge and a pair of faces on either side. The top edge is coupled to the bottom portion of the body of the aircraft. The front edge is coupled to the support beam.

1 Claim, 4 Drawing Sheets

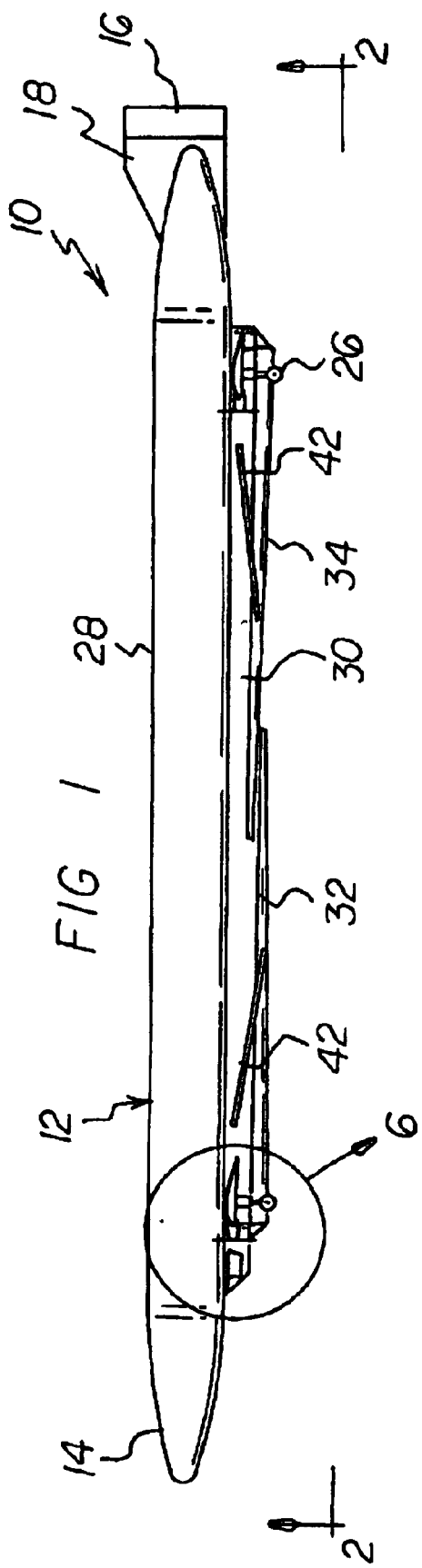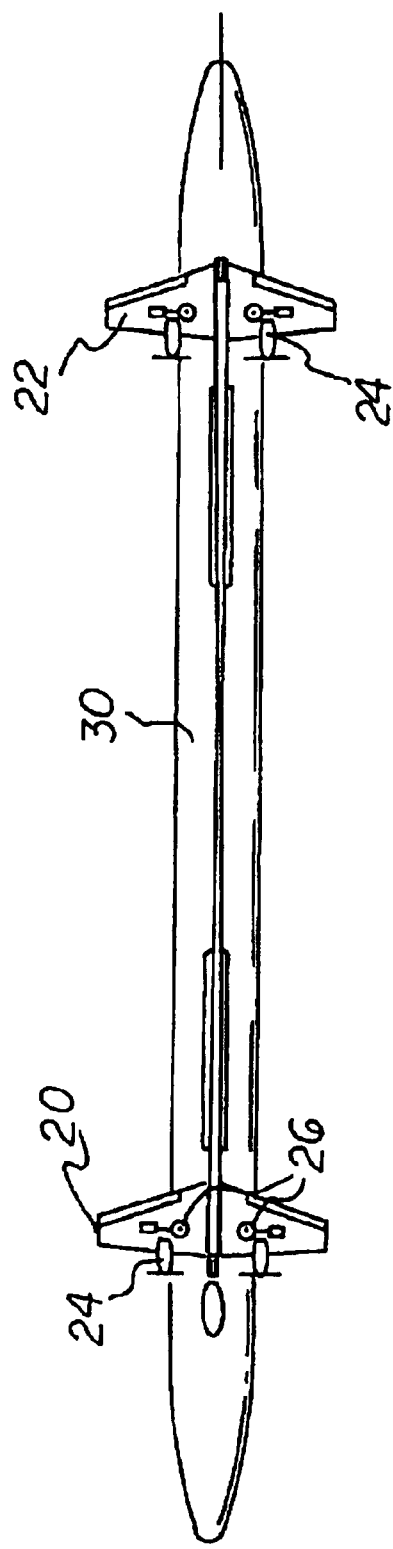

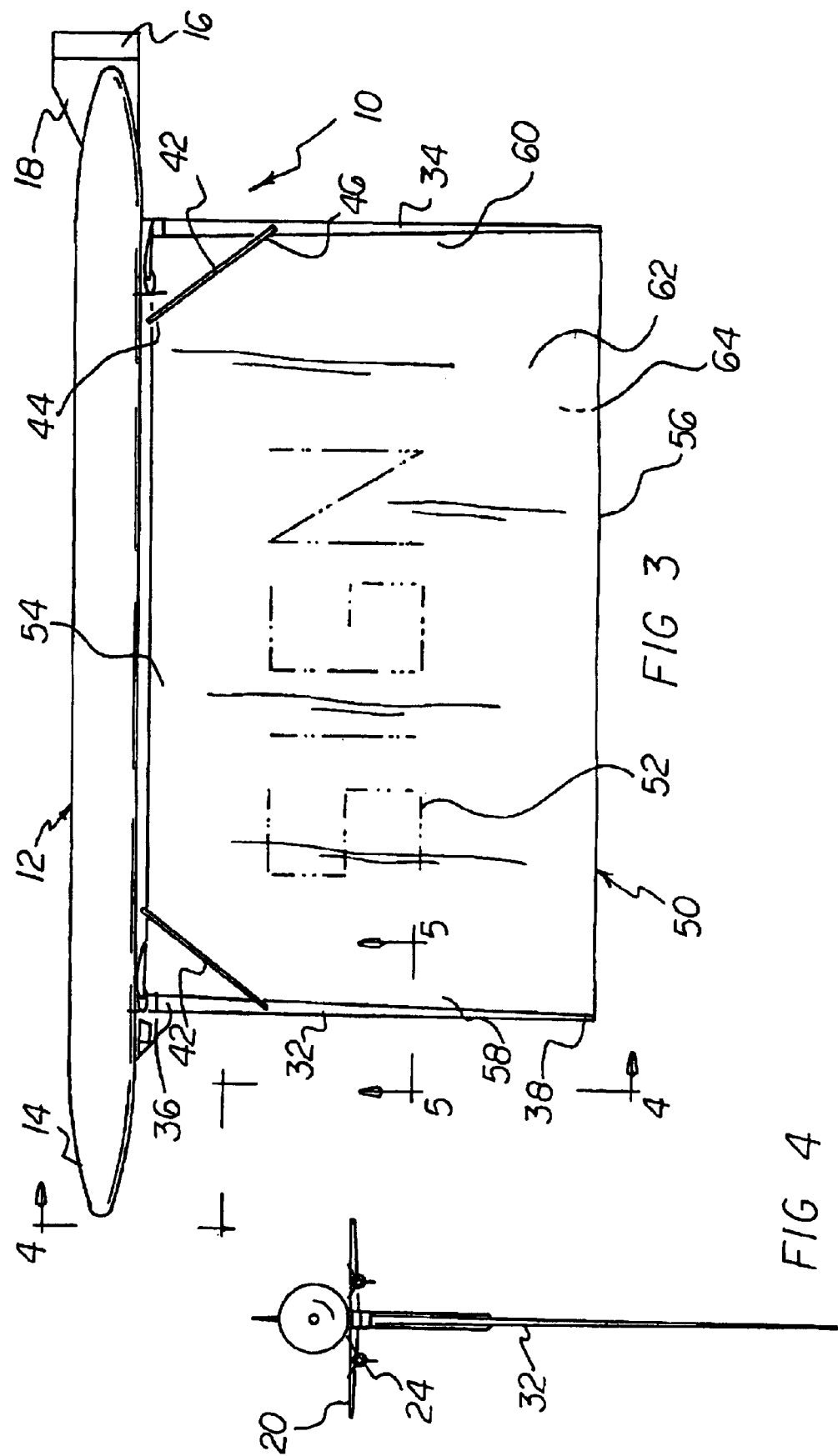

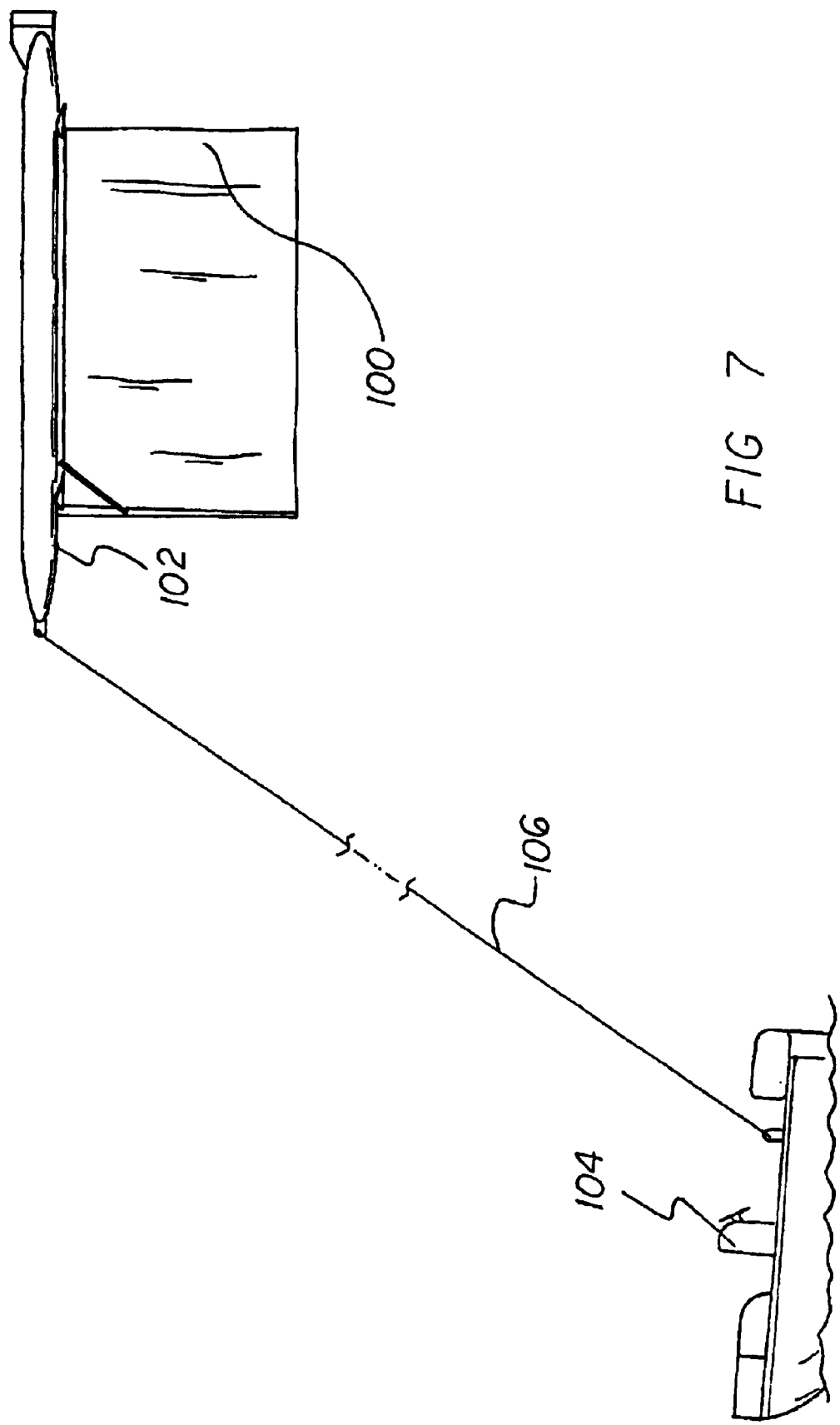

AIRCRAFT ADVERTISING SYSTEM

BACKGROUND OF THE INVENTION

1. Field of the Invention

The present invention relates to an aircraft advertising system and more particularly pertains to the advantages and flexibility of that system in providing a relatively large surface that may be extended and retracted for displaying indicia from an aircraft and exposing it to many viewers at a great range.

2. Description of the Prior Art

The use of advertising systems of known designs and configurations is known in the prior art. More specifically, advertising systems of known designs and configurations previously devised and utilized for the purpose of displaying advertisements through conventional methods and apparatuses are known to consist basically of familiar, expected, and-obvious structural configurations, notwithstanding the myriad of designs encompassed by the crowded prior art which has been developed for the fulfillment of countless objectives and requirements.

By way of example, U.S. Pat. No. 5,823,468 to Bothe discloses a hybrid aircraft. U.S. Pat. No. 5,320,306 to Gennaro discloses aircraft construction. U.S. Pat. No. 4,746,081 to Mazzoni discloses an Aircraft. U.S. Pat. No. 2,091,580 to Belinski discloses a flying machine. U.S. Pat. No. 2,023,334 to Marmonier discloses an aeroplane. U.S. Pat. No. 1,210,376 to James discloses an aeroplane. Lastly, U.S. Pat. No. 1,746,747 to Sutfin discloses an aeroplane.

While these devices fulfill their respective, particular objectives and requirements, the aforementioned patents do not describe an aircraft advertising system that provides a relatively large surface that may be extended and retracted for displaying indicia from an aircraft and exposing it to many viewers at a great range.

In this respect, the aircraft advertising system according to the present invention substantially departs from the conventional concepts and designs of the prior art, and in doing so provides an apparatus primarily developed for the purpose of displaying indicia from an aircraft and exposing it to many viewers at a great range.

Therefore, it can be appreciated that there exists a continuing need for a new and improved aircraft advertising system which can be used for displaying indicia from an aircraft and exposing it to many viewers at a great range. In this regard, the present invention substantially fulfills this need.

SUMMARY OF THE INVENTION

In view of the foregoing disadvantages inherent in the known types of advertising systems of known designs and configurations now present in the prior art, the present invention provides and improved aircraft advertising system. As such, the general purpose of the present invention, which will be described subsequently in greater detail, is to provide a new and improved aircraft advertising system and method which has all the advantages of the prior art and none of the disadvantages.

To attain this, the present invention essentially comprises an aircraft. The aircraft has a vertical stabilizer and rudder, a plurality of wings with propulsion devices, landing gear, and control surfaces. Furthermore, the aircraft is generally very long with respect to its width and height, and has means along its bottom for attaching a sign.

A sign support beam is provided. The support beam has an upper coupling end and a lower free end. The coupling end has a pivot pin. The pivot pin allows the beam to be rotated up against the bottom of the aircraft for ground operations, take offs, landings, and flight operations in which higher speeds or greater efficiencies are desired. The landing gear is able to clear the support beam when it is in its retracted state. Appropriate conventional mechanisms are provided to rotate the sign support beam, to lock it in its extended and retracted positions, and to provide additional strength if needed. The sign support beam also has a slender recess along its full length.

Further provided is a sign. The sign is of a durable fabric material. The sign is adapted to display indicia. The sign has a top edge, a bottom edge, a front edge, a rear edge and a pair of faces on opposite sides. The top edge is coupled to the bottom portion of the body of the aircraft. The front edge is slidably coupled to the support beam in the slender recess. Enlargements ensure secure couplings there between. Appropriately conventional mechanisms are provided to allow for the raising and lowering of the sign for storage and for deployment.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar and they do not depart from the spirit and scope of the present invention.

It is therefore an object of the present invention to provide a new and improved aircraft advertising system which has all of the advantages of the prior art in advertising systems of known designs and configurations and none of the disadvantages.

It is another object of the present invention to provide a new and improved aerial advertising system which increases advertising effectiveness and operational flexibility while decreasing operational cost.

It is another object of the present invention to provide a new and improved aircraft advertising system which may be easily and efficiently manufactured and marketed.

It is further an object of the present invention to provide a new and improved aircraft advertising system which is of durable and reliable constructions.

An even further object of the present invention is to provide a new and improved aircraft advertising system which is susceptible of a low cost of manufacture with regard to both materials and labor, and which accordingly is then susceptible of low prices of sale to the consuming public, thereby making such aircraft advertising system economically available to the buying public.

Even still another object of the present invention is to provide an aircraft advertising system for displaying indicia from an aircraft and exposing it to many viewers at a great range.

Lastly, it is an object of the present invention to provide a new and improved aircraft advertising system that comprises an aircraft. The aircraft is generally very long with respect to its height and width. A leading edge support beam is provided. The support beam has a coupling end and a free end. The coupling end has a pivot pin. In this manner the collapse of the beam is allowed for take off and landing of the aircraft. Also provided is a sign of a durable fabric material. The sign is adapted to display indicia. The sign has a top edge, a bottom edge, a front edge, a rear edge and a pair of faces on opposite sides. The top edge is coupled to the bottom portion of the body of the aircraft. The front edge is coupled to the support beam.

These together with other objects of the-invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of the preferred embodiment with the support beams collapsed.

FIG. 2 is a bottom view of the present invention taken along line 2—2 of FIG. 1.

FIG. 3 is a side elevational view of the present invention with the support beams extended.

FIG. 4 is a front elevational view taken along line 4—4 of FIG. 3.

FIG. 7 is a side elevational view of an alternate embodiment of the invention.

The same reference numerals refer to the same parts throughout the various Figures.

DESCRIPTION OF THE PREFERRED EMBODIMENT

Figure 5:
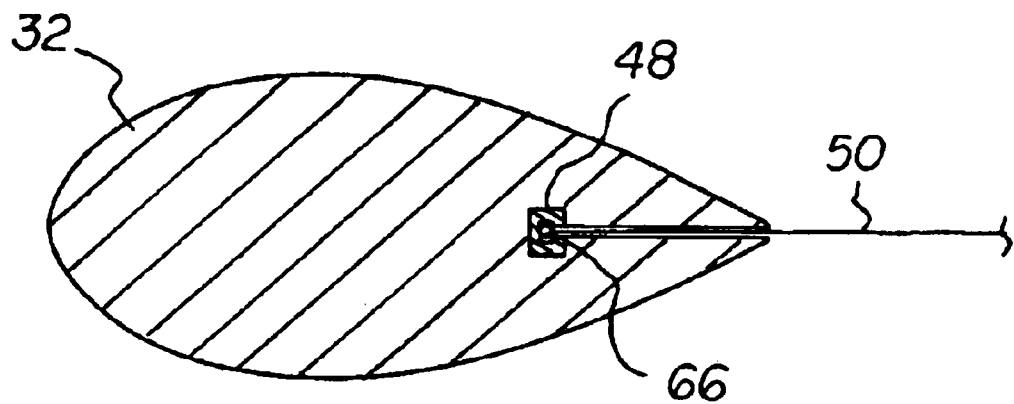
FIG. 5 is a cross sectional view of a support beam taken along line 5—5 of FIG. 3.
Figure 6:
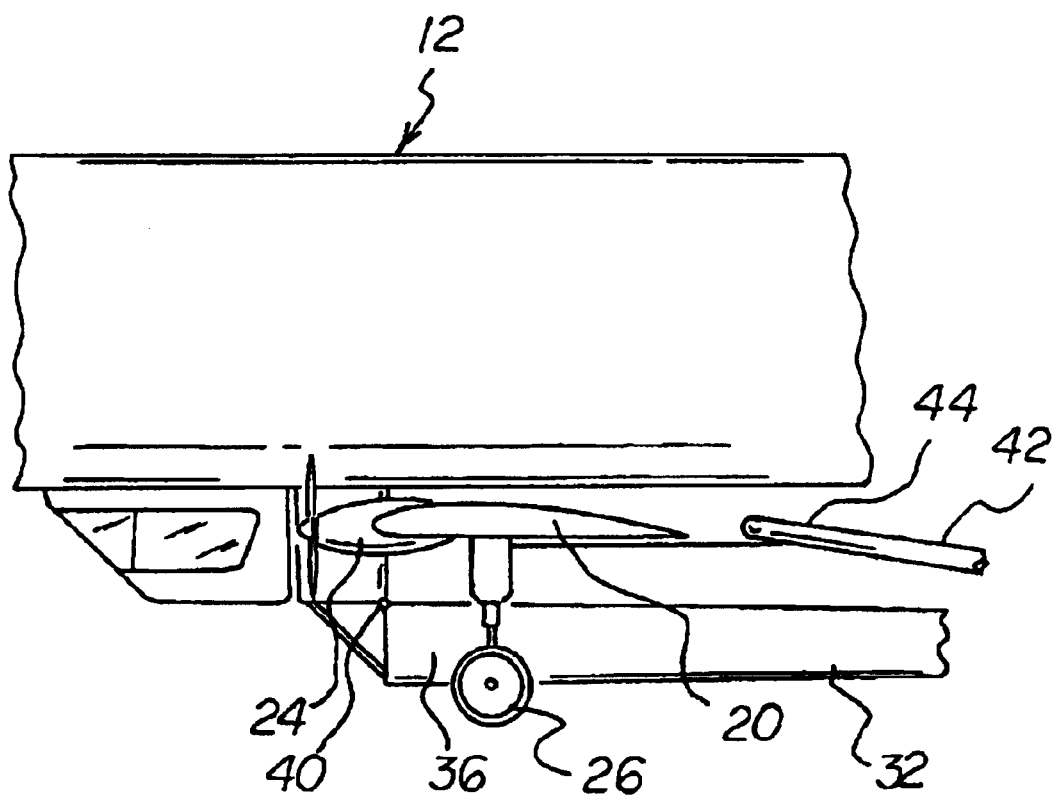
FIG. 6 is an enlarged side view of circle 6 of FIG. 1 showing the collapsed support beam and landing gear.

With reference now to the drawings, and in particular to FIG. 1 thereof, the preferred embodiment of the new and improved aircraft advertising system embodying the principles and concepts of the present invention and generally designated by the reference numeral 10 will be described.

The present invention, the aircraft advertising system 10 is comprised of a plurality of components. Such components in their broadest context include an aircraft, support beams and a sign. Such components are individually configured and correlated with respect to each other so as to attain the desired objective.

First provided is an aircraft 12. The aircraft has a lighter-than-air top portion 28 and a rigid bottom portion 30. The top portion has a generally cylindrical configuration. The top portion further has a nose cone 14, a vertical stabilizer 18, and rudder 16. The rigid bottom portion has a plurality of wings 20, 22 with propulsion devices 24, and landing gear 26.

A pair of sign support beams 32, 34 are provided. The sign support beams include a front support beam 32 and a rear support beam 34. Each support beam has a generally conical configuration. Each support beam has a tear drop cross section. In this manner drag and weight are reduced. The support beams each have an upper coupling end 36 and a lower free end 38. The coupling end has a pivot pin 40. The pivot pin allows for the collapse of the beams for ground operations, take off and landing of the aircraft, and for air operations in which higher speeds or greater efficiency are desired. The landing gear is thus able to clear the support beams when they are in their collapsed state. As an example of appropriate conventional mechanisms to rotate the sign support beams, to lock them in their extended and retracted positions, and to provide additional strength, the sign support beams further have a bracing bar 42 having an aircraft end 44 and a support beam end 46. The aircraft end is rotatably coupled to the bottom portion of the body of the aircraft. The support beam end is slidably, rotatably and lockably coupled to the support beam adjacent to the coupling end. The sign support beams also have slender recesses 48 along their full lengths.

Further provided is a sign 50. The sign is of a durable fabric material. The sign is adapted to display indicia 52. The sign has a top edge 54, a bottom edge 56, a front edge 58, a rear edge 60 and a pair of faces 62, 64 on opposite sides. The top edge is coupled to the bottom portion of the body of the aircraft. The front and rear edges are slidably coupled to their respective support beams in the slender recesses. Enlargements ensure secure couplings there between. Appropriate conventional mechanisms are provided to allow for the raising and lowering of the sign for storage and for deployment.

In an alternate embodiment of the present invention the system is as set forth in claim 2. The rear end of the sign 100 is unsupported and the aircraft 102 receives its motive power from a boat 104 with a line 106 between the boat and the aircraft. The line may couple to the aircraft as shown or to the front support beam at its midpoint and extend at any angle as between about 10 and 80 degrees. In this embodiment, the aircraft is simpler and lighter due to the absence of propulsion systems, and may receive its motive power from another powered vehicle of any type, such as another aircraft or a ground vehicle.

In additional alternate embodiments, the aircraft may be fully lighter than air and tethered to the ground. A further example would be a system wherein the aircraft is fully lighter than air and wherein the propulsion systems provide variable, vectored thrust for positive control of the aircraft at all speeds.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aircraft advertising system for displaying indicia from an aircraft and exposing it to many viewers at a great range comprising, in combination:

an aircraft having a cylindrical lighter-than-air top portion with a nose cone, a vertical stabilizer and rudder, and a tail cone; a rigid bottom portion with a plurality of wings with propulsion devices, and landing gear; a pair of sign support beams including a front support beam and a rear support beam each having a generally conical configuration having a tear drop cross section to reduce weight and drag, the support beams each having an upper coupling end and a lower free end, the coupling end having a pivot pin to allow the collapse of the beams such that the landing gear is able to clear the support beams when they are in their collapsed state, the sign support beams further having suitable mechanisms to rotate the sign support beams and to lock them in their extended and retracted positions; the sign support beams also having slender recesses along their full lengths; and a sign of a durable fabric material being adapted to display indicia and having a top edge, a bottom edge, a front edge, a rear edge and a pair of faces on opposite sides, the top edge being coupled to the rigid bottom portion of the aircraft, the front and the rear edge being coupled to their respective support beams in the slender recesses with enlargement to ensure secure slidable couplings there between.

\* \* \* \* \*